US006791643B2

(12) United States Patent
Chuang

(10) Patent No.: US 6,791,643 B2
(45) Date of Patent: Sep. 14, 2004

(54) DUAL-DISPLAY LIQUID CRYSTAL DISPLAY

(75) Inventor: Li-Sen Chuang, Penghu Hsien (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 0 days.

(21) Appl. No.: 10/452,990

(22) Filed: Jun. 3, 2003

(65) Prior Publication Data

US 2004/0080686 A1 Apr. 29, 2004

(30) Foreign Application Priority Data

Oct. 25, 2002 (TW) ........................................ 91125210 A

(51) Int. Cl.$^7$ ...................... G02F 1/1335; G02F 1/1343
(52) U.S. Cl. ........................ 349/113; 349/143; 455/566
(58) Field of Search ................................ 349/113, 143; 455/566

(56) References Cited

U.S. PATENT DOCUMENTS

| 6,466,292 B1 | * | 10/2002 | Kim ............................ 349/143 |
| 6,583,770 B1 | * | 6/2003 | Antila et al. .................. 345/1.1 |
| 2003/0112217 A1 | * | 6/2003 | Lee ............................. 345/102 |

* cited by examiner

*Primary Examiner*—Huyen Ngo
(74) *Attorney, Agent, or Firm*—Quintero Law Office

(57) ABSTRACT

A dual-display liquid crystal display structure having first and second display regions. A first substrate and a second substrate opposite the first substrate are provided. A pixel electrode pattern is formed on the first substrate. A reflective layer is formed on an interior or exterior side of the second substrate in the second display region. A filter is formed on the second substrate and the reflective layer. A common electrode is formed on the filter. A liquid crystal layer is disposed between the first substrate and the second substrate. A light device is disposed on an exterior side of the first substrate.

12 Claims, 1 Drawing Sheet

DUAL-DISPLAY LIQUID CRYSTAL DISPLAY

BACKGROUND OF THE INVENTION

1. Field of the Invention

The present invention relates to a liquid crystal display (LCD) structure, and more particularly, to a dual-display LCD structure for displaying data on front and rear surfaces thereof.

2. Description of the Related Art

The display characteristics of high definition, multicolor displays, include low power consumption, lower voltage requirements and light weight make liquid crystal displays (LCDs) a leading display device technology. LCDs, for example, have been used for several years as mobile information displays in, personal digital assistants (PDAs), portable computers, mobile phones, and the like.

Recently, a folding type mobile phone, taking advantage of the advances in fabrication techniques and the desire to display data on front and rear surfaces of the folding portion (or upper housing) thereof, has been developed. A conventional folding type mobile phone utilizes two individual LCDs whose rear surfaces are in contact with each other to achieve a dual-display.

However, since the conventional display device uses two individual displays, two sets of electrical equipment for driving the LCDs are required. Accordingly, the display device increases in size and weight and the fabrication cost also increases.

SUMMARY OF THE INVENTION

The object of the present invention is to provide a dual-display LCD structure for displaying data on front and rear surfaces thereof.

Another object of the present invention is to provide a dual-display LCD structure with a single liquid crystal layer.

Yet another object of the present invention is to provide a dual-display LCD structure having transmissive and reflective modes.

In order to achieve these objects, the present invention provides a dual-display LCD structure having first and second display regions. A first substrate and a second substrate opposite the first substrate are provided. A pixel electrode pattern is formed on the first substrate. A reflective layer is formed on an interior or exterior side of the second substrate in the second display region. A (color) filter is formed on the second substrate and the reflective layer. A common electrode is formed on the filter. A liquid crystal layer is disposed between the first substrate and the second substrate. A light device is disposed on an exterior side of the first substrate.

The present invention improves on the prior art in that the LCD structure has a reflective layer formed on an interior or exterior side of the second substrate in the second display region. Thus, the LCD structure with a single liquid crystal layer according to the invention has transmissive and reflective functions, which can display data on front and rear surfaces thereof, thereby reducing weight and costs and ameliorating the disadvantages of the prior art.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
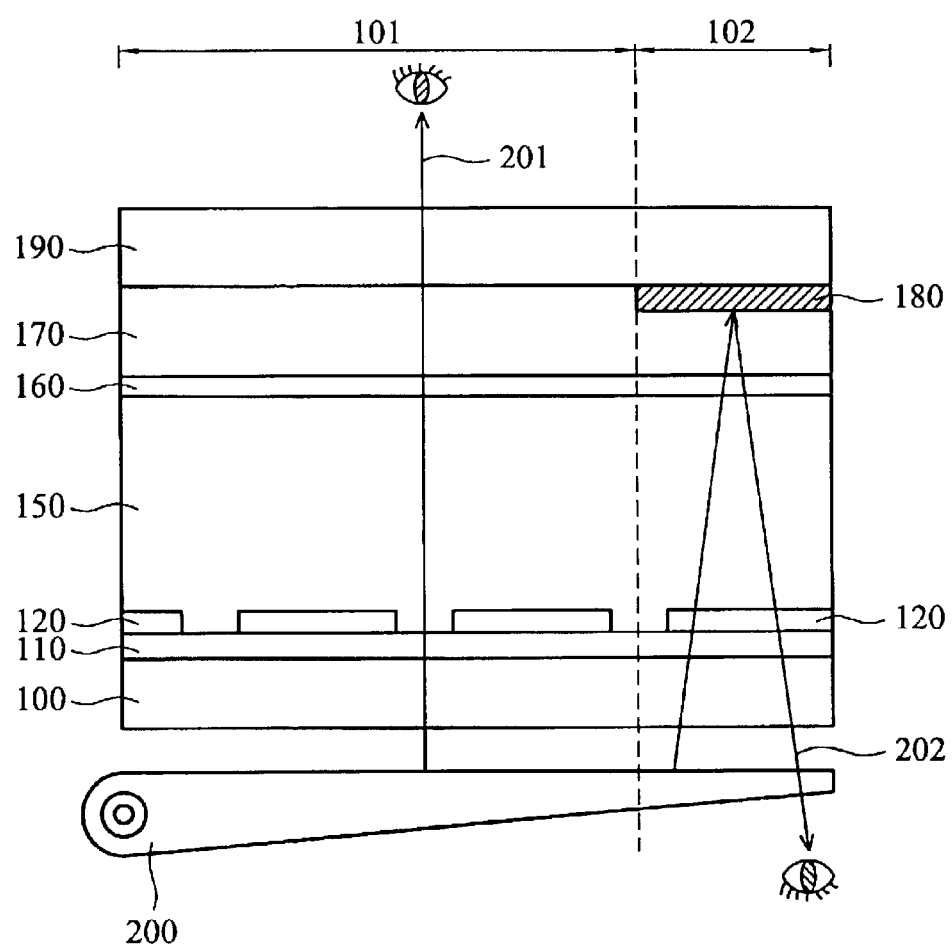
FIG. 1 is a schematic view of a dual-display LCD structure according to an embodiment of the present invention.

The present invention provides a dual-display LCD structure.

FIG. 1 is a schematic view of a dual-display LCD structure according to an embodiment of the present invention.

In FIG. 1, the dual-display LCD structure has a predetermined first display region 101 and a predetermined second display region 102. Both the first display region 101 and the second display region 102 include at least one display area (pixel area). Here, the first display region 101 can serve as a main display region and the second display region 102 can serve as an auxiliary display region.

In FIG. 1, a first substrate 100 and a second substrate 190 opposite the first substrate 100 are provided. The first substrate 100 can be a transparent substrate, such as a glass or quartz substrate. The first substrate 100 can comprise a pixel driving element array (e.g. a thin film transistor array, not shown) formed thereon. The material of the second substrate 190 can be glass, quartz or the like.

In FIG. 1, a transparent insulation layer 110 can be formed on an interior surface of the first substrate 100. The transparent insulation layer 110 may be an organic layer formed by coating.

In FIG. 1, a pixel electrode pattern 120 is formed on the transparent insulation layer 110. As a demonstrative method of forming the pixel electrode pattern 120, referring to FIG. 1, a transparent conductive layer (not shown) is formed on the transparent insulation layer 110, wherein the transparent conductive layer may be an indium tin oxide (ITO) layer or an indium zinc oxide (IZO) layer formed by sputtering. Then, using photolithography and etching, the desired pixel electrode pattern 120 is obtained.

In FIG. 1, a reflective layer 180 is selectively formed on an interior or exterior side of the second substrate 190 in the second display region 102. FIG. 1 shows the reflective layer 180 formed on an interior surface of the second substrate 190 in the second display region 102, but is not intended to limit the present invention. Preferably, the reflective layer 180 is an aluminum layer or a silver layer formed by sputtering, and the thickness of the reflective layer 180 may be about 0.1 $\mu$m.

In FIG. 1, a filter 170 is formed on the second substrate 190 and the reflective layer 180. The filter 170 can be a color or monochromatic filter. In this embodiment, the color filter is preferred.

In FIG. 1, a common electrode 160 is formed on the filter 170. The common electrode 160 can be an indium tin oxide (ITO) layer or an indium zinc oxide (IZO) layer formed by sputtering.

In FIG. 1, a display material, such as liquid crystal molecules, is filled in a space between the first substrate 100 and the second substrate 190 to form a liquid crystal layer 150.

In FIG. 1, a light device 200 is disposed on an exterior side of the first substrate 100. The light device 200 can be a light emitting module including a cold cathode fluorescent tube and a light guiding panel. Thus, the dual-display LCD structure of the present invention is obtained.

It should be note that, when the light device 200 is located in the first display region 101 and the second display region 102, the light device 200 can simultaneously serve as a backlight source for the LCD structure in the first display region 101 and a front light source for the LCD structure in the second display region 102, as shown in FIG. 1. Nevertheless, when the light device 200 is located only in the first display region 101, it serves as a backlight source for the LCD structure in the first display region 101.

That is, the LCD structure in the first display region 101 is a transmissive type (or mode) LCD. Referring to FIG. 1, transmissive light 201 from the light device 200 penetrates the LCD structure and displays the image on the front side of the second substrate 190 (i.e. the viewer side). The LCD structure in the second display region 102 is a reflective type (or mode) LCD. Referring to FIG. 1, a reflective light 202 from the light device 200 or ambient light (not shown) is reflected from the reflective layer 180 and displays the image on the rear side of the first substrate 100 (i.e. another viewer side). Therefore, the LCD structure with a single liquid crystal layer 150 according to the invention has both transmissive and reflective functions, which can display data on front and rear surfaces thereof.

In addition, depending on different mechanical designs, the first display region 101 and the second display region 102 can be abutting or separate.

Thus, the present invention provides a novel dual-display LCD structure with a single liquid crystal layer and a reflective layer formed on part of the second substrate. The display structure of the invention uses one display, only one set of electrical equipment for driving the LCD is needed, thereby reducing costs, volume occupation, and ameliorating the disadvantages of the prior art.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A dual-display liquid crystal display structure having first and second display regions, comprising:
   a first substrate and a second substrate opposite the first substrate;
   a pixel electrode pattern formed on the first substrate;
   a reflective layer formed on a side of the second substrate in the second display region;
   a filter formed on the second substrate and the reflective layer;
   a common electrode formed on the filter;
   a liquid crystal layer disposed between the first substrate and the second substrate; and
   a light device disposed on an exterior side of the first substrate.

2. The dual-display liquid crystal display structure according to claim 1, wherein the first substrate is a transparent substrate comprising a thin film transistor array.

3. The dual-display liquid crystal display structure according to claim 1, wherein the pixel electrode pattern is an indium tin oxide (ITO) layer, or an indium zinc oxide (IZO) layer.

4. The dual-display liquid crystal display structure according to claim 1, wherein the reflective layer is formed on an interior side or an exterior side of the second substrate in the second display region.

5. The dual-display liquid crystal display structure according to claim 1, wherein the reflective layer is an aluminum layer or a silver layer.

6. The dual-display liquid crystal display structure according to claim 1, wherein the common electrode is an indium tin oxide (ITO) layer, or an indium zinc oxide (IZO) layer.

7. The dual-display liquid crystal display structure according to claim 1, wherein the light device is disposed in the first display region.

8. The dual-display liquid crystal display structure according to claim 1, wherein the light device is located in the first display region and the second region.

9. The dual-display liquid crystal display structure according to claim 1, wherein the dual-display liquid crystal display structure is a transmissive type liquid crystal display structure in the first display region.

10. The dual-display liquid crystal display structure according to claim 1, wherein the dual-display liquid crystal display structure is a reflective type liquid crystal display structure in the second display region.

11. The dual-display liquid crystal display structure according to claim 1, wherein the first display region and the second display region are abutting or separate.

12. The dual-display liquid crystal display structure according to claim 1, wherein the filter is a color filter or a monochromatic filter.

* * * * *